Feb. 26, 1963   C. B. NEWCOMB, JR   3,079,457
COVERS FOR ELECTRICAL EQUIPMENT
Filed Dec. 21, 1959   3 Sheets-Sheet 1

Cyrus B. Newcomb, Jr.,
Inventor.
Koenig and Pope,
Attorneys.

Feb. 26, 1963  C. B. NEWCOMB, JR  3,079,457
COVERS FOR ELECTRICAL EQUIPMENT
Filed Dec. 21, 1959  3 Sheets-Sheet 2
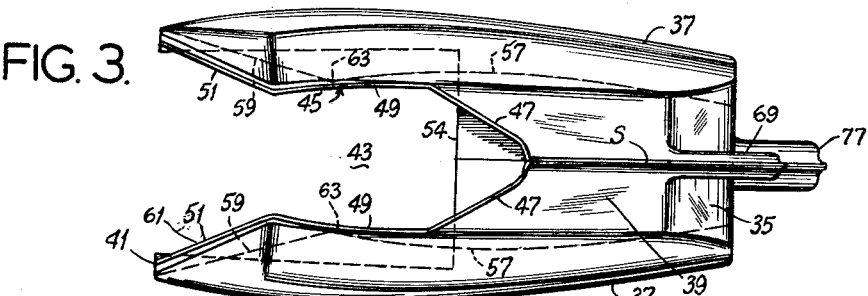
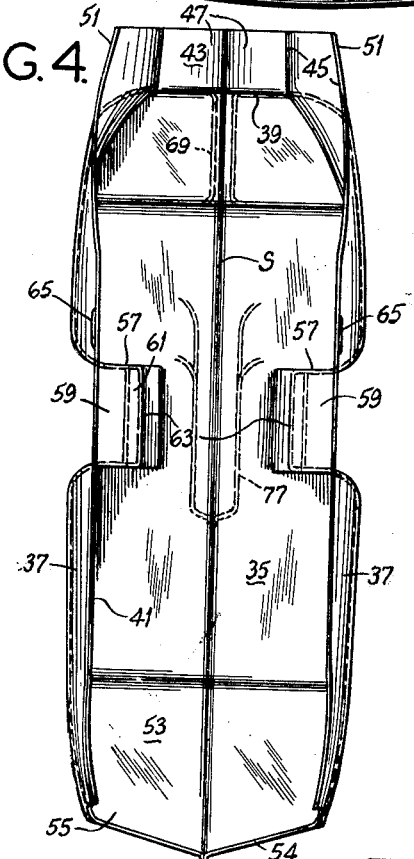
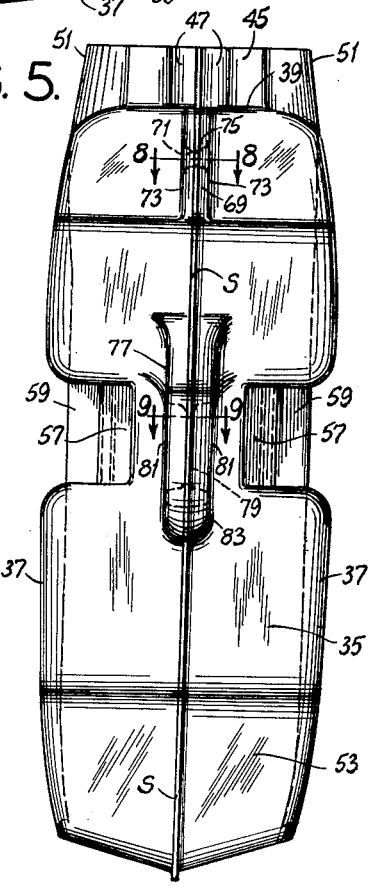
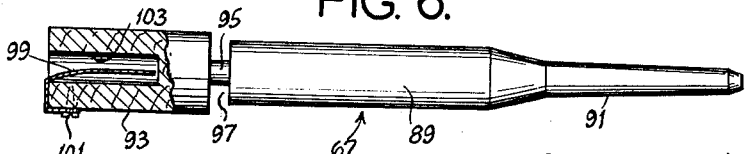
Cyrus B. Newcomb, Jr.,
Inventor.
Koenig and Pope,
Attorneys.

Feb. 26, 1963 C. B. NEWCOMB, JR 3,079,457
COVERS FOR ELECTRICAL EQUIPMENT
Filed Dec. 21, 1959 3 Sheets-Sheet 3

Cyrus B. Newcomb, Jr.,
Inventor.
Koenig and Pope,
Attorneys.

United States Patent Office 3,079,457
Patented Feb. 26, 1963

3,079,457
COVERS FOR ELECTRICAL EQUIPMENT
Cyrus B. Newcomb, Jr., Dayton, Ohio, assignor to A. B. Chance Company, Centralia, Missouri, a corporation of Missouri
Filed Dec. 21, 1959, Ser. No. 860,785
6 Claims. (Cl. 174—5)

This invention relates to covers for use on power transmission line equipment to minimize the electrical hazard to linemen working around the equipment, and more particularly to a protective cover for use on cutouts for this purpose.

It will be understood that a typical power transmission line cutout is an open type cutout comprising an insulator carrying contact fixtures holding a fuse tube, the insulator having a bracket attached thereto by means of which it is mounted on a cross arm on a pole. This open type of cutout, being unenclosed and unprotected, presents a dangerous shock hazard to linemen working therearound. Heretofore, efforts have been made to provide protection for linemen by applying a rubber blanket around the cutout, but the use of such a blanket is inexpedient since it is difficult properly to apply a blanket for complete protection, and it is difficult to insure that the blanket will stay in proper position. It takes a considerable amount of time to apply a blanket completely to cover a cutout and, even though a blanket may completely cover a cutout, it may still not afford complete protection since it is in direct contact with conductive parts of the cutout at numerous points, and its insulation characteristics may be insufficient to provide satisfactory protection at such points. Moreover, such a blanket cannot, as is desirable, conveniently be handled by the usual insulated lineman's pole or so-called hot stick, as is the case with the present invention. While an important application of the invention is to the open type cutouts above mentioned, it is also applicable and useful in connection with enclosed types of cutouts and the like.

Accordingly, among the several objects of this invention may be noted the provision of a relatively stiff protective cover (as distinguished from a flexible cover like a blanket) which may be quickly, easily and safely applied in the field over a cutout completely to protect linemen from electrical hazard while working around the cutout, which may be positively locked in place over the cutout to keep it from becoming disarranged or falling off, and which may be quickly, easily and safely removed when no longer needed; the provision of a cover such as described which, as properly mounted in position around a cutout, has no portion thereof in contact with any conductive parts of the cutout and which resists displacement such as would tend to bring portions thereof into contact with conductive parts of the cutout; the provision of a cover such as described which is applicable to various sizes of cutouts; the provision of a cutout such as described which may be readily handled by conventional linemen's equipment such as hot sticks; the provision of a cover such as described a plurality of which are adapted to be nested for convenience in transportation; and the provision of a tough, durable, economical cover such as described adapted to withstand hard usage. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated, FIG. 1 is a view in side elevation of a cover of this invention applied to a single insulator fused open type cutout, parts of the cover being broken away, and showing in phantom how a hot stick may be applied to the cover;

FIG. 3 is a top plan view of the cover per se;

FIG. 4 is a rear elevation of the cover per se;

FIG. 5 is a front elevation of the cover per se;

FIG. 6 is a view in elevation, partly broken away and shown in section, of a locking pin used with the cover;

Figure 8:
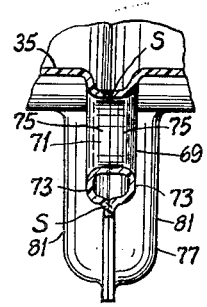
Figure 9:
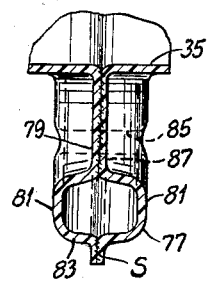

FIGS. 8 and 9 are sections taken on lines 8—8 and 9—9, respectively, of FIG. 5.

Corresponding reference characters indicate corresponding parts throughout the several views of the drawings.

Figure 1:
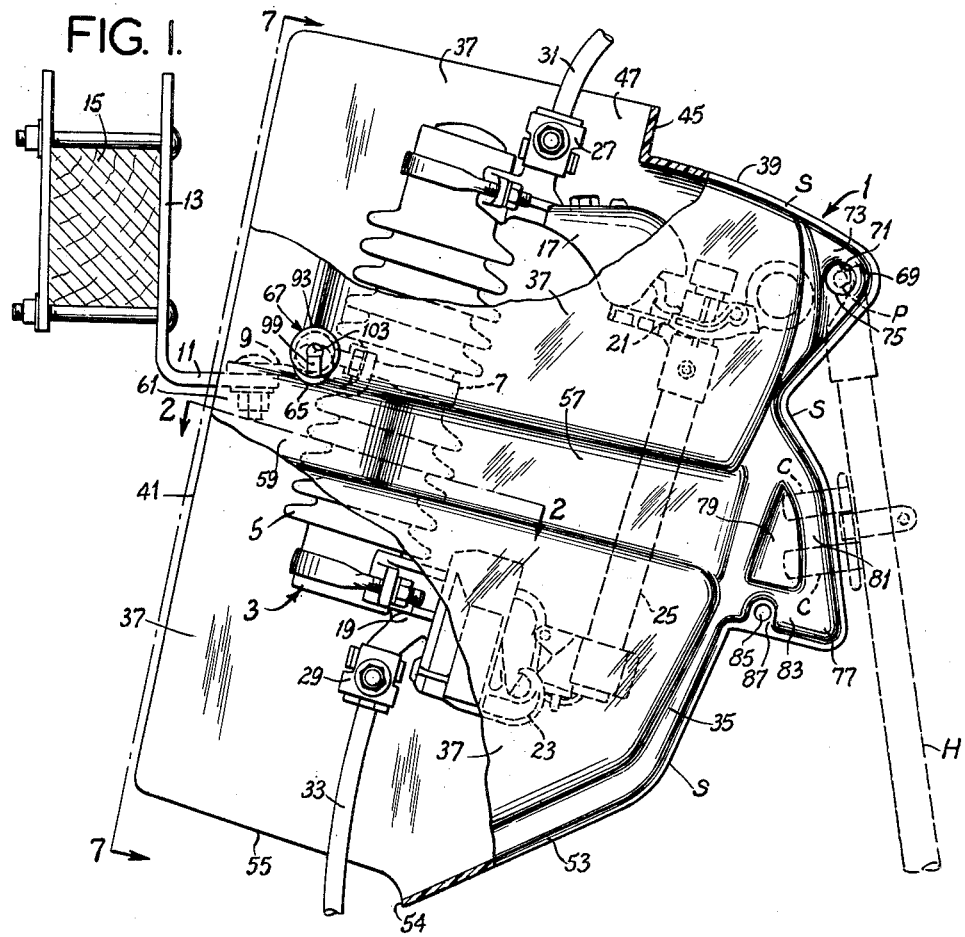
Figure 2:
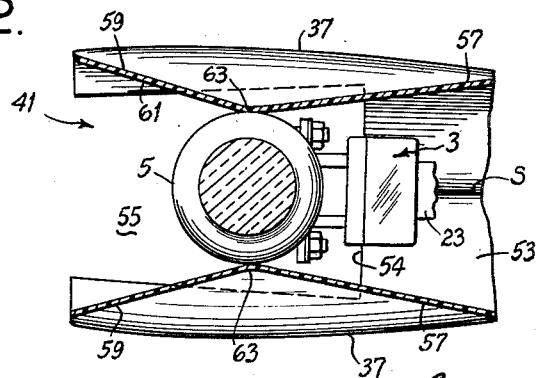
FIG. 2 is a section taken on line 2—2 of FIG. 1.
Figure 7:
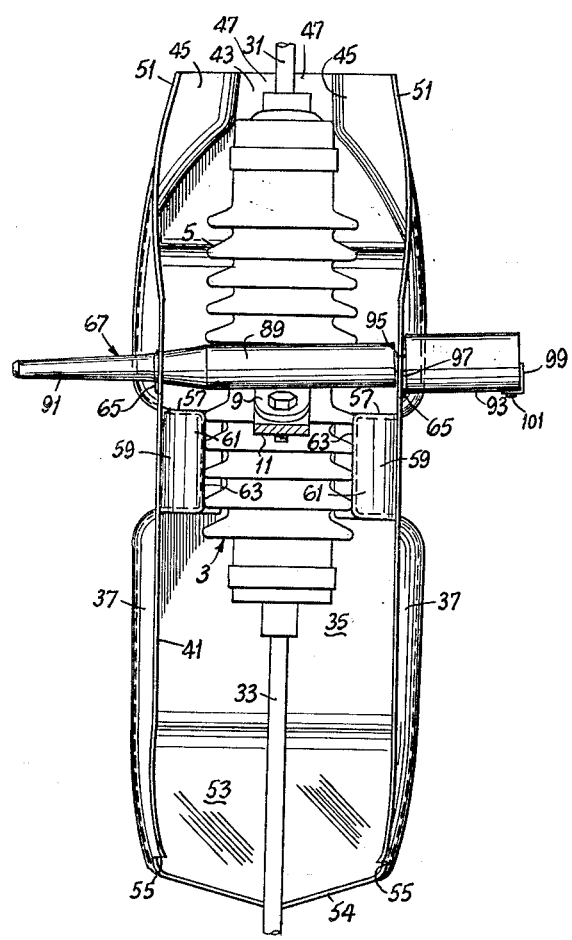
FIG. 7 is a section taken on line 7—7 of FIG. 1.

Referring to the drawings, FIGS. 1, 2 and 7 illustrate a cover 1 of this invention in place over a single insulator fused open type cutout 3. As will be understood, the cutout 3 comprises an insulator 5 having a band 7 around its central portion to which is secured a mounting bracket 9. The latter is conventionally secured to an arm 11 on a member 13 which is clamped to a cross arm 15 on a pole (not shown). The insulator is conventionally supported thereby in an inclined position as appears in FIG. 1. At the upper and lower ends of the insulator are contact supporting arms 17 and 19. These carry contact fixtures 21 and 23 which support a fuse tube 25. Connectors 27 and 29 are provided on arms 17 and 19 for connection thereto of conductors 31 and 33, the former usually extending upward from the cutout and the latter usually extending downward from the cutout. The cover 1 is adapted completely to surround the cutout in such manner as substantially to eliminate electrical hazard to linemen working around the cutout.

The cover 1, as illustrated, comprises a casing formed of relatively stiff insulating plastic material, having a front wall 35, side walls 37 extending rearward from the front wall and a partial top wall 39, being completely open at the rear as indicated at 41. Any tough plastic having the requisite stiffness, impact strength and dielectric strength may be used, such as linear polyethylene. A wall thickness of the order of one-tenth of an inch has been found satisfactory when such plastic is used. With this wall thickness, the walls of the casing are quite stiff, but the side walls 37 are readily flexed about their juncture with the front wall 35. As shown, the casing may be formed from two identical molded half-shells which are heat-sealed together in the central vertical plane of the casing as indicated at S.

The top wall 39 of the casing is cut away to provide an opening 43 extending forward in the top wall from the rear, and this opening is bounded by an upwardly extending collar 45 which has forward portions 47 divergent toward the rear, intermediate side portions 49 slightly convergent toward the rear, and flaring divergent rear end portions 51. The front wall 35 has a lower end portion 53 which is inclined downward and toward the rear to the bottom of the casing. Rearward of the lower edge 54 of this inclined lower end portion 53 of the front wall, the bottom of the casing is substantially completely open as indicated at 55 all the way to the rear of the casing.

As appears best in FIG. 3, the side walls 37 are of slightly rounded form from front to rear, being of convex form as viewed from the outside of the casing. About midway of the overall height of the casing, each side wall is formed with an inwardly offset rib 57 extending from the rear of the casing to the front wall, each of these ribs having an outwardly angled rearward end portion 59. These outwardly angled rearward end portions 59 of the ribs 57 define an entrance throat 61 converging inward from the rear of the casing to a relatively narrow neck 63 at the forward ends of angled portions 59. Each side wall has a hole 65 therein just above the respective angled rib end portion 59, adjacent to upper rear corner of the casing, the holes 65 in the two side walls being aligned for reception of a locking pin 67 to be described.

At the upper front corner of the casing is a lug 69 having a hole 71 for receiving a pin P extending laterally from the end of a hot stick H. This lug is formed by molding each of the above-mentioned half-shells with walls 73 extending outward in spaced-apart relation and merging at their outer margins where they are heat-sealed together at S, these walls having inwardly directed tubular portions 75 the ends of which are heat-sealed together. These tubular portions 75 meet end-to-end and define the hole 71, providing a relatively broad surface for engagement by the pin P on the hot stick.

Approximately at the center of the front wall of the casing is a handle 77 generally of triangular shape. This handle includes a flat web portion 79 and a hollow flange portion 81 along the outside thereof for engagement by spring clips C on the hot stick. The hollow flange formation continues along the bottom of the handle as indicated at 83, and a hole 85 is provided in a flat area 87 adjacent the bottom of the handle.

As shown best in FIG. 6, the locking pin 67, which may be made of wood, has a cylindrical shank 89 of smaller diameter than holes 65, with a tapered forward end 91. It has a cylindrical head 93 of larger diameter than holes 65 joined to the shank by a portion 95 of smaller diameter than the shank. This provides an annular groove 97 at the juncture of the head and shank, the width of this groove being somewhat greater than the thickness of the casing side walls 37. A leaf spring 99 has one end fixed at 101 to the head and extends into an axial socket 103 which extends inward from the outer end of the head.

The cover or casing 1 may be applied over the cutout as by entering pin P on hot stick H in hole 71 and applying clips C on the hot stick to the flange 81 of handle 77. Then the casing is lifted into a position in front of the cutout with the open rear end of the casing toward the cutout, and swung by means of the hot stick into a position straddling the cutout, i.e., with the side walls 37 of the casing on opposite sides of the cutout. As the casing is applied to the cutout, the outwardly angled rearward end portions 59 of ribs 57 of the casing side walls on opposite sides of throat 61 engage opposite sides of the cutout insulator 5, and the casing side walls are wedged apart. In the preferred final position of the casing, the insulator 5 is located within the neck 63 defined by the ribs 57, the ribs being springingly in contact with the insulator at this neck. The opening 43 in the casing top wall 39 accepts the connector 27 and the conductor 31, and the collar 45 surrounds this connector. Portions of the top wall 39 at opposite sides of opening 43 engage the top of the insulator 5. Opening 55 at the bottom of the casing accepts the connector 33.

With the casing positioned as above described, holes 65 lie rearward of the insulator 5 and above the cutout mounting bracket 9. The pin on another hot stick is inserted in the socket 103 of the locking pin 67, a tight connection being obtained by means of the leaf spring 99 in the socket. The locking pin 67 is inserted through holes 65 to the point where the inner end of the head 93 engages one of the casing side walls 37, and the casing is then allowed to drop down slightly so that the marginal portion of this one side wall above the respective hole 65 engages in the groove 97 in the locking pin 67. The locking pin 67 usually bears on the mounting bracket 9, and the weight of the casing keeps it down on the pin and interlocked with the pin by reason of the engagement of the casing side wall in the groove 97. When the locking pin has been inserted (it may be inserted from either side of the casing), the hot sticks are removed. It will be understood that, if desired, the portion 93 of the locking pin 67 may be used for manual gripping of the pin for application or removal thereof to and from the casing or shell S. The pin, being composed of wood, is of an insulating nature, but if desired, it also may be composed of insulating material other than wood.

With the casing 1 applied as above described, complete protection is provided. The casing cannot readily become disarranged or fall off. The casing itself is maintained out of contact with conductive parts of the cutout, providing substantial air space between itself and these conductive parts. Thus, even though the casing walls are relatively thin, electrical hazard is minimized. The casing may be suitably dimensioned for application to various sizes of cutouts, for example, one size of casing may be made to fit 5 kv., 7.5 kv. and 15 kv. single insulator, fused, open type cutouts of the type herein illustrated. Several casings may be readily nested together to conserve space. The casing is also adapted to be handled by hot sticks other than the type above-mentioned. For example, a so-called fuse-puller hot stick may be used, being clamped to the flat area 87 of the handle 77. Or a so-called shotgun hot stick may be used, the hook thereof being inserted in hole 85 in the handle.

While the cover or casing 1 is above described as applied to a single insulator, fused, open type cutout, it will be understood that covers of this invention are applicable to other types of equipment for protective purposes. For example, a cover or casing 1 may be used in certain circumstances to cover a cutout of the enclosed type.

From the above it will be seen that the casing is in the nature of a hollow, substantially stiff shell of insulating material which, by means of its supports, may be hoisted on a lineman's stick. In view of its flexibility, particularly around its open portions, it may be sprung into enveloping and gripping position over the appropriate cutout, thereafter the insulating locking pin being used for positive interlock between the shell and the cutout.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. A cover adapted for application in the field to a fuse cutout to avoid electrical hazard to linemen working around the cutout, comprising a casing made of substantially stiff insulating material having spaced apart side walls and a front wall and being open at the rear for application over a cutout from the front of the cutout, each side wall having an inwardly offset rib extending forward from the rearward edge thereof, each rib having an outwardly angled rearward end portion defining a throat converging inward from the rear of the casing to a neck, each of the side walls having a hole therein adjacent the rear of the casing and above the ribs, said holes being aligned; and a locking pin removably received within said holes in bridging relationship to said side walls.

2. A cover as set forth in claim 1 having an apertured lug at the upper front corner thereof and a handle extending outward from the front wall below the lug.

3. A cover as set forth in claim 2 having a top wall with an opening therein extending from the rear toward the front of the casing.

4. A cover as set forth in claim 3 having a collar extending upward from the top wall around the opening in the top wall.

5. A cover as set forth in claim 4 wherein the collar has forward portions divergent toward the rear, intermediate side portions convergent toward the rear, and flaring divergent rear end portions.

6. Apparatus for covering a device such as a fuse cutout in an electrical power distribution system, said apparatus comprising a casing of insulating material having a pair of opposed side walls and an opening therein adjacent said side walls, said casing being adapted for receiving said device therein through said opening thereof, said side walls each having a hole therein adjacent said opening, said holes being aligned; and an elongated locking element removably received within the holes in bridging relationship to said side walls, said element having a groove therein adjacent one of said side walls when the element is disposed within said holes, the portions of said one side wall defining the hole thereof being received within the groove.

References Cited in the file of this patent

UNITED STATES PATENTS

| | | |
|---|---|---|
| 2,163,790 | Kerr | June 27, 1939 |
| 2,263,319 | Treanor | Nov. 18, 1941 |
| 2,575,480 | Zimsky | Nov. 20, 1951 |
| 2,590,559 | Miller | Mar. 25, 1952 |

FOREIGN PATENTS

| | | |
|---|---|---|
| 221,150 | Great Britain | Sept. 4, 1924 |
| 505,013 | Great Britain | May 1, 1939 |

OTHER REFERENCES

Publication I, "New Equipment," published in Electrical World, March 2, 1959 (page 68 relied on).